(No Model.)
M. MICHELS & J. PAULY.
WHEEL.
No. 460,211.        Patented Sept. 29, 1891.
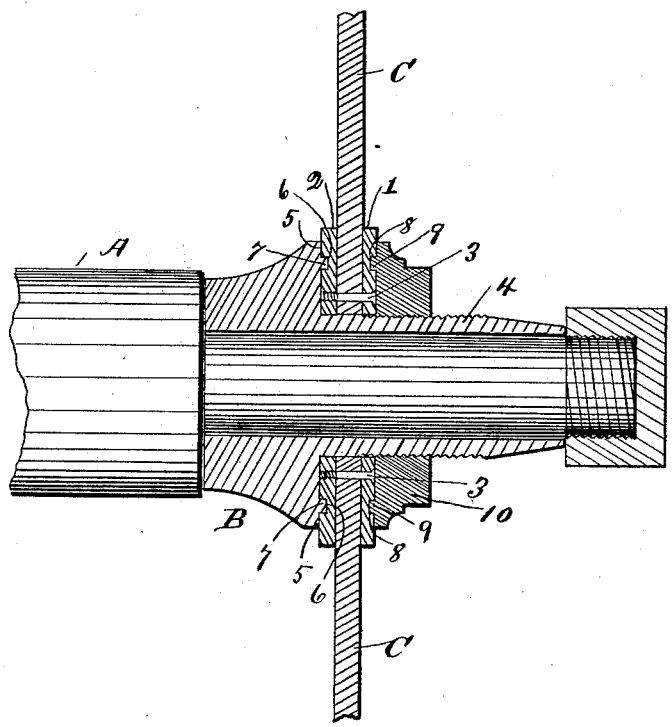
Witnesses:
V. F. Kennedy
Otto Luebkert
Inventors
Michel Michels & Joseph Pauly
By ........ Kennedy
their attorney

UNITED STATES PATENT OFFICE.

MICHEL MICHELS AND JOSEPH PAULY, OF CHICAGO, ILLINOIS.

WHEEL.

SPECIFICATION forming part of Letters Patent No. 460,211, dated September 29, 1891.

Application filed June 13, 1891. Serial No. 396,129. (No model.)

*To all whom it may concern:*

Be it known that we, MICHEL MICHELS, a subject of the Emperor of Germany, and JOSEPH PAULY, a citizen of the United States, both residing at Chicago, in the county of Cook and State of Illinois, have invented certain new and useful Improvements in Wheels; and we do hereby declare the following to be a full, clear, and exact description of the invention, such as will enable others skilled in the art to which it appertains to make and use the same.

This invention relates to a novel construction in wheels, the special objects of our invention being to provide a wheel so constructed that the spokes may be tightened at will and removed or replaced when found convenient, and to construct such a wheel in a durable manner embracing a minimum number of parts.

The invention consists in the features of construction and combinations of parts hereinafter fully described and specifically claimed.

The accompanying drawing shows a central longitudinal section of a wheel-hub constructed in accordance with our invention and showing the end portion of the axle and the inner portions of the spokes.

Referring to said drawing, A indicates the axle. B indicates as a whole the hub, and C the spokes.

In accordance with our invention the inner ends of the spokes C are located and secured between two washers 1 and 2. Various devices can be employed for securing said spokes between the washers; but as a convenient means the said washer 1 is provided with suitable smooth apertures that permit the passage of a bolt 3, that passes through apertures in the end of the spokes C. The ends of said bolts 3 are screw-threaded and engage with screw-threaded apertures in the washer 2.

The hub consists of a hollow spindle 4, exteriorly screw-threaded and provided at its inner end with an annular shoulder 5. The washers are large enough to pass over the spindle 4, and the washer 2, that preferably lies next to the shoulder 5, is provided with an annular groove 6, that receives an annular rib 7 on the face of said shoulder 5. The washer 1 is provided on its outer face with an annular groove 8, that receives an annular rib 9 on the inner face of a nut 10, that screws upon the spindle 4 of the hub.

It will be plainly obvious from the foregoing description that we provide a highly serviceable and durable construction of wheel. The spokes are securely fastened between the washers, and can be tightened when convenient by tightening the bolts 3. The washers and spokes are rigidly held between the shoulder 5 on the hub and the nut 10, and the interfitting grooves and ribs on said parts add to the rigidty of such connection. It is further obvious that a spoke or spokes can be easily removed or replaced by simply removing the screws that hold the spokes in place, so that the necessity of removing the tire and felly is obviated when a spoke is to be removed or replaced.

We claim as our invention—

A wheel having its spokes secured between two washers, said washers fitting over a spindle of a hub and secured between a shoulder on said hub and a nut having a screw-threaded connection with said spindle, and the washers, shoulder, and nut being provided with interfitting annular grooves and ribs.

In testimony whereof we affix our signatures in presence of two witnesses.

MICHEL MICHELS.
JOSEPH PAULY.

Witnesses:
HARRY COBB KENNEDY,
OTTO LUEBKERT.